W. M. FRANCE AND L. B. JONES
QUICK ADJUSTING BEARING.
APPLICATION FILED AUG. 12, 1919.

1,348,705.

Patented Aug. 3, 1920.

W. M. France
L. B. Jones, Inventor

By Geo. P. Kimmel
Attorney

UNITED STATES PATENT OFFICE.

WALTER M. FRANCE AND LEROY B. JONES, OF MESHOPPEN, PENNSYLVANIA.

QUICK-ADJUSTING BEARING.

1,348,705.    Specification of Letters Patent.    Patented Aug. 3, 1920.

Application filed August 12, 1919. Serial No. 316,972.

*To all whom it may concern:*

Be it known that we, WALTER M. FRANCE and LEROY B. JONES, citizens of the United States, residing at Meshoppen, in the county of Wyoming and State of Pennsylvania, have invented certain new and useful Improvements in Quick-Adjusting Bearings, of which the following is a specification.

The invention relates to an adjustable bearing for use with rotating shafts of various types, as line shafting, power transmission shafting of automobiles or the like, the crank shaft of an internal combustion engine, and other shaftings, and more particularly to the class of quick adjusting bearings.

The primary object of the invention is the provision of a bearing of this character, wherein the babbitts are mounted about the shafting, so that the said babbitts will be prevented from any rotary movement and the same can be quickly adjusted to take up wear and to prevent any looseness of the shaft in the bearing, thereby avoiding any possibility of lost motion and the irregular movement of the driven part or parts, as well as preventing any regularity of the wearing of such parts.

Another object of the invention is the provision of a bearing of this character, wherein the bushings will be positively held in adjusted positions, the adjustment of the bushings being effected in a novel manner and are prevented from any displacement when adjusted to take up wear of the same or the shaft about which said bearings fit.

A further object of the invention is the provision of a bearing of this character, which is extremely simple in construction, readily, easily and quickly adjusted, thoroughly reliable and efficient in its purpose, strong, durable, and inexpensive to manufacture and install.

With these and other objects in view, the invention consists in the features of construction, combination and arrangement of parts, as will be hereinafter fully described, illustrated in the accompanying drawings, and pointed out in the claim hereunto appended.

In the accompanying drawings.

Similar reference characters indicate corresponding parts throughout the several views in the drawings.

Figure 1:
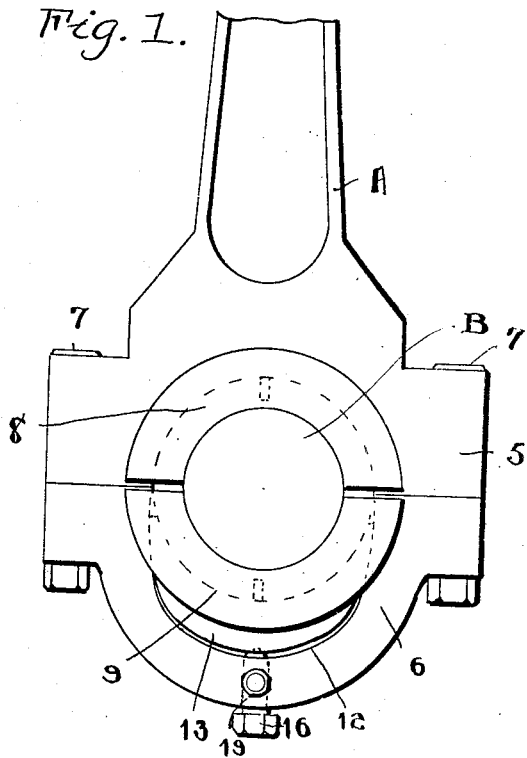
Figure 1 is a fragmentary side elevation of a crank shaft connecting rod, showing the bearing constructed in accordance with the invention applied thereto.

Referring to the drawing in detail, A designates a portion of a connecting rod of an internal combustion engine, and B the crank shaft, the connecting rod being provided with the usual shaft box 5 to which is detachably connected a removable cap 6, the same being attached to said boxing through the medium of nut carrying bolts 7 and within said boxing and cap is held the quick adjusting bearing hereinafter fully described.

The quick adjusting bearing comprises the companion, semi-cylindrical babbitts or bushings 8 and 9 respectively, which are removably held in the box 5 and cap 6 and through which is inserted the crank shaft P as usual. One or both of the babbitts or bushings are slightly less than a half cylinder so that the same are spaced apart by the shaft B when in position as shown in Fig. 1 of the drawings.

Figure 2:
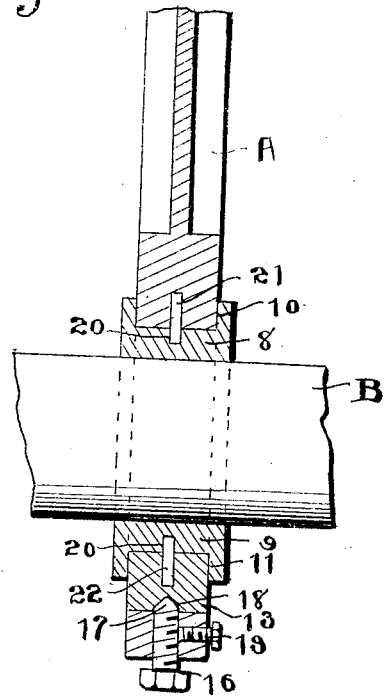
Fig. 2 is a fragmentary vertical sectional elevation through the bearing.
Figure 3:
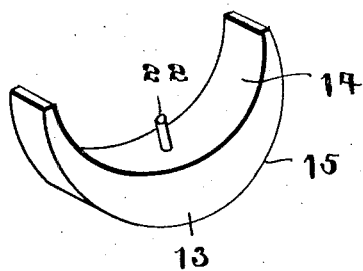
Fig. 3 is a perspective view of the adjustable bushing or follower member of the bearing.

The babbitt or bushing 8 in its outer peripheral edge is formed with a channel or groove 10 to accommodate the edge of the recess in the box 5 for the interfitting engagement of said bushing 8 therewith, and likewise the babbitt or bushing 9 is formed in its outer peripheral edge with a groove or channel 11 for the interfitting engagement thereof with a cap 6 which is provided with an oval-shaped recess 12 for accommodating the said bushing 9 and a substantial crescent moon-shaped follower 13, which is formed with a semi-circular shaped inner edge 14 correspondingly to the contour of the groove or channel 11 in the babbitt or bushing 9 to engage therein, while the other edge of said follower is of oval shape as at 15 correspondingly to the shape of the closed end of the recess 12, so that the follower will be properly fitted between the cap 6 and the bushing 9 as is clearly shown in Figs. 1 and 2 of the drawing.

Threaded centrally in the cap 6 transversely therethrough is an adjusting screw or plug 16 which is formed with a tapered end 17 adapted to be seated in a correspondingly shaped notch 18 formed in the outer edge 15 of the follower 13 so as to prevent any possibility of rotary movement of the follower in the cap as will be clearly apparent.

Threaded in the cap 6 laterally through one side thereof is a set screw 19 which engages the adjusting screw or plug 16 to hold the same locked in said cap.

Formed in the babbitts 8 and 9 centrally thereof and opening in the channels 10 and 11 are diametrically opposite sockets 20 for receiving dowels or pins 21 and 22, respectively, the dowel 21 being fixed in the box 5, while the dowel 22 is mounted in the follower 13 and in this manner the said babbitts are prevented from rotary movement when embracing the shaft B and likewise said follower 13 is held against rotary movement by the adjusting screw 16, as will be clearly obvious.

It will be apparent that the bushing 9 can be adjusted so as to take up wear by manipulating the adjusting screw 16 after releasing the set screw 19 in the cap 6, the adjusting screw 16 being readily accessible at the lower end of the connecting rod.

From the foregoing, it is thought that the construction and manner of operation of the quick adjusting bearing will be clearly understood and therefore a more extended explanation has been omitted.

What is claimed is:

A quick adjustable bearing for shafts comprising in combination with a box and cap therefor, a pair of semi-cylindrical babbitts, each having an outer peripherally grooved edge to interfit the box and cap and adapted to embrace a shaft and spaced apart thereby, a pin carried by the box and engaged in one of the babbitts, a follower fitted in the cap and working against the other babbitt, a pin carried by the follower and engaged in said other babbitt, an adjusting screw carried by the cap and working against the follower and having its inner end seated in said follower, and means engaged in the cap to co-act with the adjusting screw to lock the same in adjusted position, the follower being seated in the outer peripherally grooved edge of the babbitt adjacent thereto.

In testimony whereof, we affix our signatures hereto.

WALTER M. FRANCE.
LEROY B. JONES.